(12) United States Patent
Wu et al.

(10) Patent No.: US 7,944,193 B2
(45) Date of Patent: May 17, 2011

(54) DIGITAL PWM MODULATOR WITH FAST DYNAMIC RESPONSE AND FINE RESOLUTION

(75) Inventors: Wenkai Wu, East Greenwich, RI (US);
Ken Boyden, Thousand Oaks, CA (US);
Rami Hamze, Los Gatos, CA (US)

(73) Assignee: International Rectifier Corporation, El Segundo, CA (US)

( * ) Notice: Subject to any disclaimer, the term of this patent is extended or adjusted under 35 U.S.C. 154(b) by 220 days.

(21) Appl. No.: 12/117,405

(22) Filed: May 8, 2008

(65) Prior Publication Data

US 2009/0015231 A1    Jan. 15, 2009

Related U.S. Application Data

(60) Provisional application No. 60/916,636, filed on May 8, 2007.

(51) Int. Cl.
*G05F 1/40* (2006.01)
(52) U.S. Cl. ........................ 323/283; 323/288
(58) Field of Classification Search ............ 323/282, 323/283, 285, 288; 375/238, 244, 252; 714/746, 714/798; 341/120, 122, 126, 143, 144, 155, 341/158
See application file for complete search history.

(56) References Cited

U.S. PATENT DOCUMENTS

| 5,311,548 | A | 5/1994 | Nikolaus | |
|---|---|---|---|---|
| 6,313,770 | B1* | 11/2001 | Cave | 341/122 |
| 6,674,387 | B1* | 1/2004 | Ott | 341/155 |
| 7,157,889 | B2 | 1/2007 | Kernahan et al. | |
| 7,372,384 | B1* | 5/2008 | Xu | 341/143 |
| 7,576,673 | B2* | 8/2009 | Straussnigg et al. | 341/143 |
| 2006/0023781 | A1 | 2/2006 | Leung et al. | |
| 2006/0055388 | A1 | 3/2006 | Tang et al. | |

OTHER PUBLICATIONS

International Search Report and Written Opinion in corresponding International Application No. PCT/US2008/05892 mailed Aug. 29, 2008.

* cited by examiner

*Primary Examiner* — Matthew V Nguyen
(74) *Attorney, Agent, or Firm* — Farjami & Farjami LLP

(57) ABSTRACT

A pulse width (PWM) controller for a voltage converter having at least one switch, an Analog to Digital Converter (ADC) circuit for digitizing inputted state variables including a feedback voltage from an output of the voltage converter and a reference voltage for setting the output of the voltage converter and providing a digital error signal, and a Proportional Integration and Derivation (PID) circuit receiving the digital error signal and providing a digital duty cycle signal. The controller including a Digital to Analog Converter (DAC) circuit for converting the digital duty cycle signal into an analog DAC output signal; and a comparator circuit for comparing a first signal including the DAC output signal with a reference signal for generating a pulse width modulated control signal for controlling the switching of the at least one switch of the voltage converter.

19 Claims, 8 Drawing Sheets

DIGITAL PWM MODULATOR WITH FAST DYNAMIC RESPONSE AND FINE RESOLUTION

CROSS-REFERENCE TO RELATED APPLICATION

This application is based on and claims priority to U.S. Provisional Patent Application Ser. No. 60/916,636, filed on May 8, 2007 and entitled DIGITAL PWM MODULATOR WITH FAST DYNAMIC RESPONSE AND FINE RESOLUTION, the entire contents of which are hereby incorporated by reference.

BACKGROUND OF THE INVENTION

The present invention relates to digital controllers and more particularly to preventing degradation of dynamic performance of digital controllers due to phase lagging.

Most of the digital controllers of power converters developed up to now are based on a conventional architecture in which Analog-to-Digital Converters (ADCs) digitize the ADCs' state variables. In these digital controllers, a digital control algorithm determines a duty-cycle, which is used to drive a digital Pulse Width Modulator (PWM) for providing a Proportional Integration and Derivation (PID) compensation signal. Such PID compensation signal introduces undesired phase lagging due to the sampling effect and control delays, which include latency delay and clock based signal processing. The phase lagging leads to degraded dynamic performance of the digital controllers.

One of major challenges in digital control are quantization effects. The DPWM and ADC are two major quantizers in digital-controlled power converters. The duty cycle exported by the DPWM can only have discrete values, and the resolution of the discrete duty cycle ultimately determines the resolution of the output voltage. If there is no desired output voltage value inside the zero-error bin of the ADC, limit cycle oscillations will happen. A high DPWM resolution can greatly reduce the limit cycle oscillations. Therefore, a high frequency and high-resolution design of the DPWM becomes a major challenge in the implementation of the digitally controlled power converters having reasonable die size.

Further, light load efficiency is becoming a more and more important factor in choosing PWM controllers. Currently, to achieve a high-frequency and high resolution DPWM, high clock frequencies have to be used, making the related power consumption intolerable as compared to analog counterparts to the PWM controllers.

SUMMARY OF THE INVENTION

It is an object of the present invention to provide a dedicated derivative control that reduces sampling effects and control delays, enables high dynamic performance, improving the bandwidth limitation of conventional digital control solutions, while maintaining all the potential advantages of digital controllers.

It is another object of the present invention to eliminate a limited cycle that is due to fine PWM resolution generated by comparing a Ramp signal and an output of PID compensation in an analog domain.

It is still another object of the present invention to introduce a feed forward control in the analog domain using an input voltage controlled ramp.

It is yet another object of the present invention to substantially decrease the power consumption of a PWM controller by maintaining the frequency of the system clock the same as the switching frequency.

It is further another object of the present invention to decrease the die size and power consumption of the PWM controller by enabling the use of windowed ADC and DAC with a fewer number of bits.

Provided is a pulse width (PWM) controller for a voltage converter having at least one switch, an Analog to Digital Converter (ADC) circuit for digitizing inputted state variables including a feedback voltage from an output of the voltage converter and a reference voltage for setting the output of the voltage converter and providing a digital error signal, and a Proportional Integration and Derivation (PID) circuit receiving the digital error signal and providing a digital duty cycle signal. The controller including a Digital to Analog Converter (DAC) circuit for converting the digital duty cycle signal into an analog DAC output signal; and a comparator circuit for comparing a first signal including the DAC output signal with a reference signal for generating a pulse width modulated control signal for controlling the switching of the at least one switch of the voltage converter.

Other features and advantages of the present invention will become apparent from the following description of the invention that refers to the accompanying drawings.

DETAILED DESCRIPTION OF EMBODIMENTS OF THE INVENTION

Figure 1A:
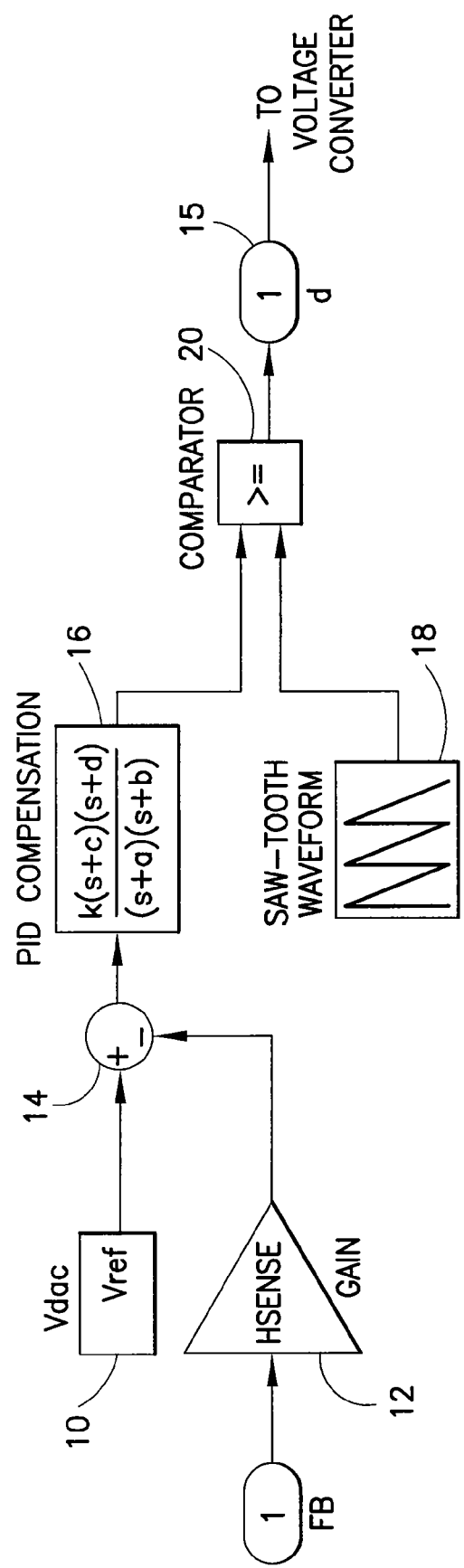
FIG. 1(a) is a block diagram of a conventional analog voltage mode PWM controller.

FIG. 1(a) illustrates a conventional analog voltage mode PWM having a circuit 10 for providing a reference voltage value $V_{ref}$, an amplifier circuit 12 for receiving a feed back voltage value FB from the voltage converter (not shown) and providing a gain value to a circuit 14, which adds the inverse of the gain value and the reference voltage value $V_{ref}$ which sets the converter output voltage. The calculated difference between the reference and a real output of the feed back voltage value FB is fed into a PID compensation circuit 16, e.g., an error amplifier, that executes a transfer function in the frequency domain that provides a product of $[k(s+c)(s+d)]/[(s+a)(s+b)]$, which is the compensation desired to be carried out in the embodiment. A comparator 20 compares the output of the PID 16 compensation circuit with a saw-tooth waveform 18 and provides a resulting digital PWM duty-cycle signal 15. This is provided to control the switches of the converter.

Figure 1B:
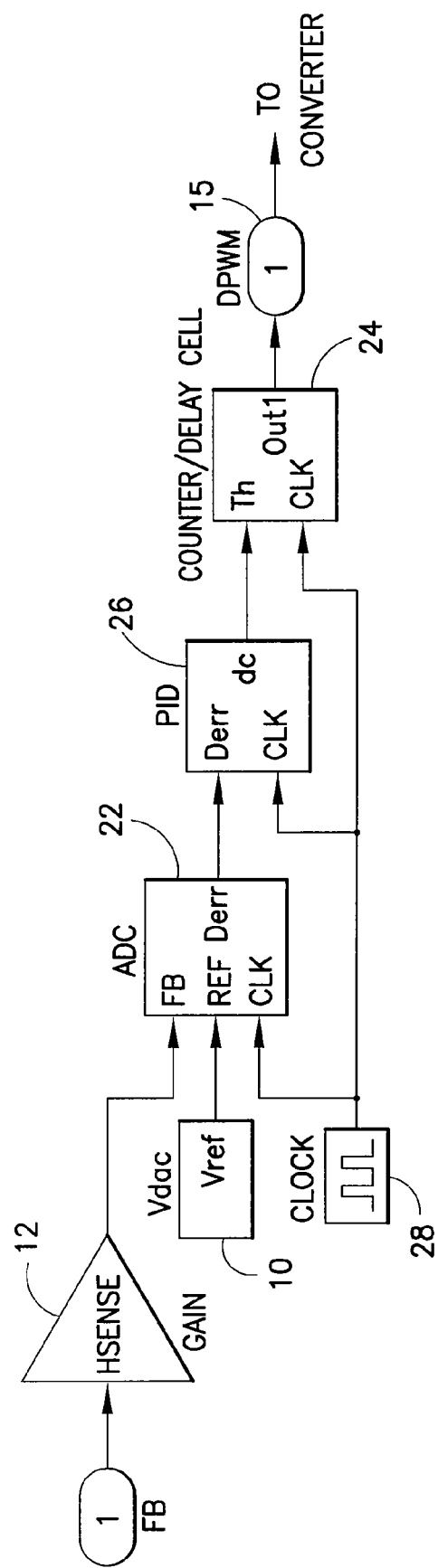
FIG. 1(b) is a block diagram of a conventional digital PWM corresponding to the analog voltage mode PWM controller of FIG. 1(a)

FIG. 1(b) shows an implementation of a corresponding digital PWM. The illustrated controller includes an ADC 22 to digitize the converter state variables, e.g., the feed back voltage value FB from the amplifier circuit 12, and the reference voltage value $V_{ref}$ received from the circuit 10, synchronized to the clock signal from a clock circuit 28. A PID compensation circuit 26 receives the clock signal from the clock circuit 28 and an output error value $D_{err}$ from the ADC 22 and uses a digital control algorithm to determine the duty-cycle (dc), which, after a delay generated by a counter/delay circuit 24 generates a driving digital PWM signal 15. This architecture simply duplicates the analog approach discussed with reference to FIG. 1(a). As illustrated, in the conventional digital PWMs, an output PWM signal 15 is generated by a counter or delay cell in the digital domain.

Figure 2A:
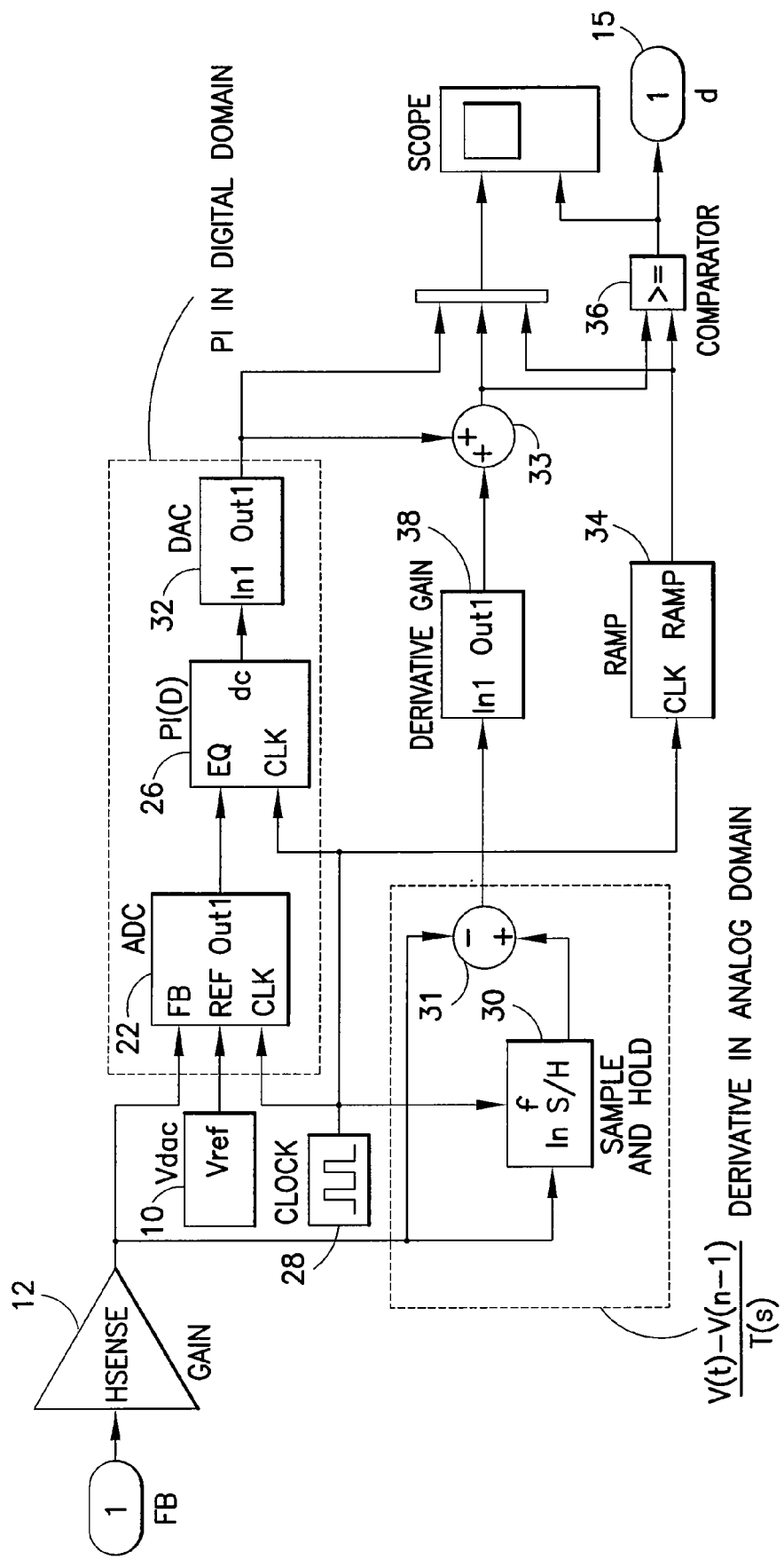
FIG. 2(a) is a block diagram of a preferred embodiment of a digital PWM controller of the present invention.

A digital PWM controller of the present invention, an example of which is illustrated in FIG. 2(a), provides a novel approach of using a Digital to Analog Converter (DAC) circuit 32 to convert the digitized duty cycle signal into the analog domain and compare in a comparator 34 the thus converted output signal with a RAMP signal from an analog RAMP circuit 36 to generate the output PWM signal 15.

The behavior of the PWM generation of the inventive circuit of FIG. 2(a) is the same as that of an analog PWM. Therefore, theoretically PWM resolution is infinite. To compensate for the sampling effect and delays in the digital domain, an analog derivative gain circuit 38 processes a term determined by a sample and hold circuit 30, which is added to the output of the DAC circuit 32. The sample and hold circuit 30 receives the clock and feedback signals and before delivery to the derivative gain circuit 38, its output is summed by summer 31 with the inverse of the undelayed feedback signal at 31. The derivative analog signal is calculated in accordance with the following formula: $(V(t)-V(n-1)/T(s)$. With such arrangement, the delay on the derivative action is minimized, potentially enabling wide-bandwidth controllers. The output of gain circuit 38 is then provided to summer 33 for summing with the output of the DAC 32.

In an implementation of the inventive controller any kind of the ADC circuit 22 may be used. That is because, since the inventive controller mainly handles proportional and integration compensation which relates DC accuracy, speed is no longer a high priority. A trade-off among cost, power consumption, and resolution is preferred. Further, since the output is always around the reference $V_{dac}$, a window based ADC is recommended.

Also, a low pass filter may be implemented after the output of the DAC circuit 32, and thus the inventive controller may use a DAC circuit with a fewer number of bits. The windowed ADC circuit 22 and the DAC circuit 32 with a fewer number of bits can be used to decrease the die size and power consumption.

Figure 2B:
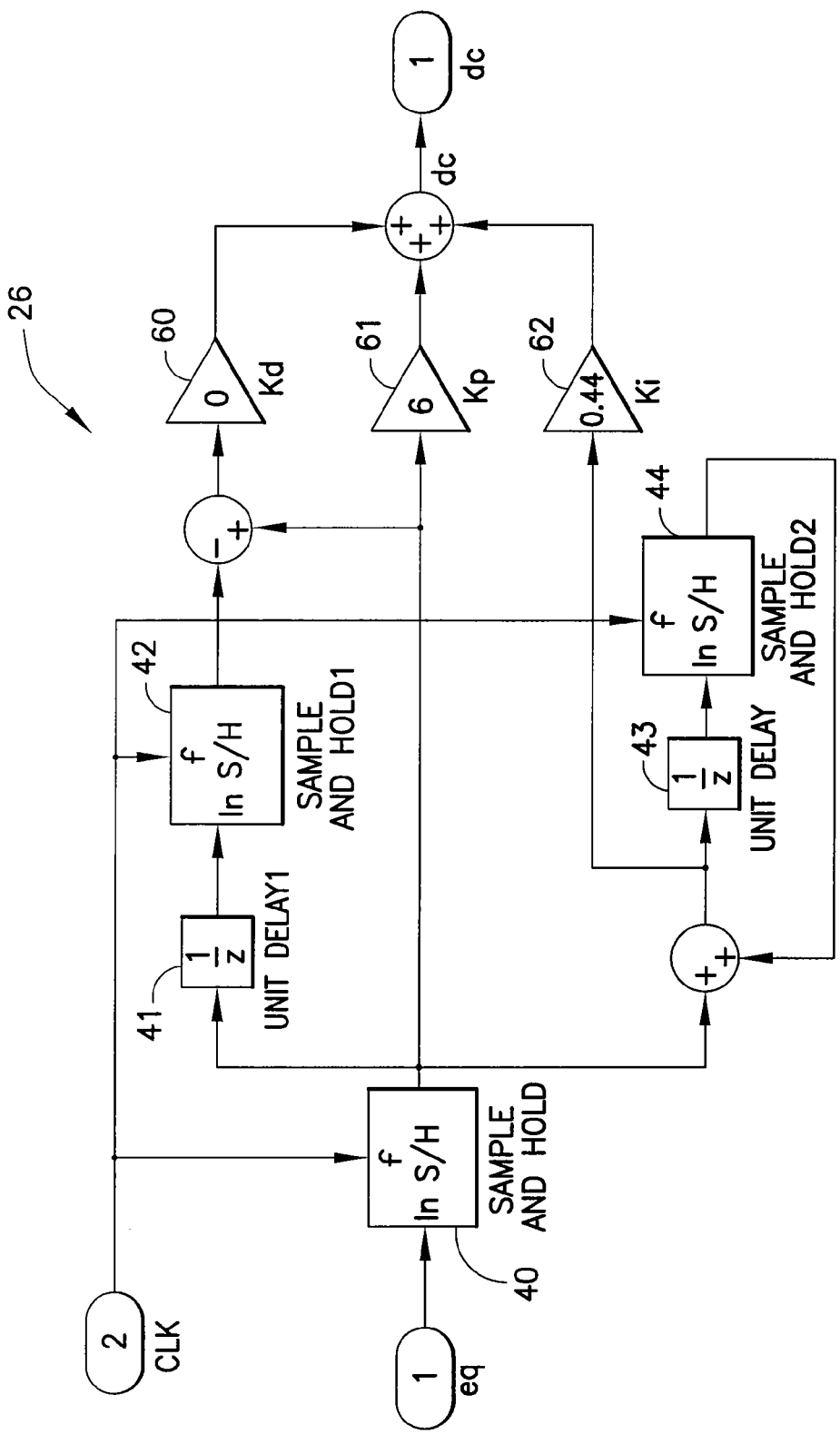
FIG. 2(b) is a block diagram of a PID circuit used in the preferred embodiment of the digital PWM controller of FIG. (2a)

Although a dedicated derivative control is introduced, a moderate digital derivative term in the digital PID circuit 26, as shown in FIG. 2(b), may still be used in an actual application. The circuit 26 includes sample and hold circuits 40, 42, and 44, all receiving the clock signal and a voltage value. The voltage value to the sample and hold circuit 42 is provided by a delay circuit 41, which receives its input from the sample and hold circuit 40. The voltage signal to the sample and hold circuit 44 is provided by a delay circuit 43, which input is a sum of the outputs of the sample and hold circuits 40 and 44. Finally, the output signal of the PID circuit 26 is a sum of an output from amplifier 61 (gain $K_p$) from the sample and hold circuit 40, output from amplifier 60 (gain $K_d$) from the sample and hold circuits 40 and 42, and an output from amplifier 62 (gain $K_i$) from the sample and hold circuits 40 and 44.

The Ramp signal from the ramp circuit 34 (FIG. 2a) is synchronized with the system clock 28 and is kept within analog domain. Therefore, there is no need to have a clock frequency higher than the converter switching frequency, substantially decreasing the power consumption of the PWM controller.

Figure 3A:
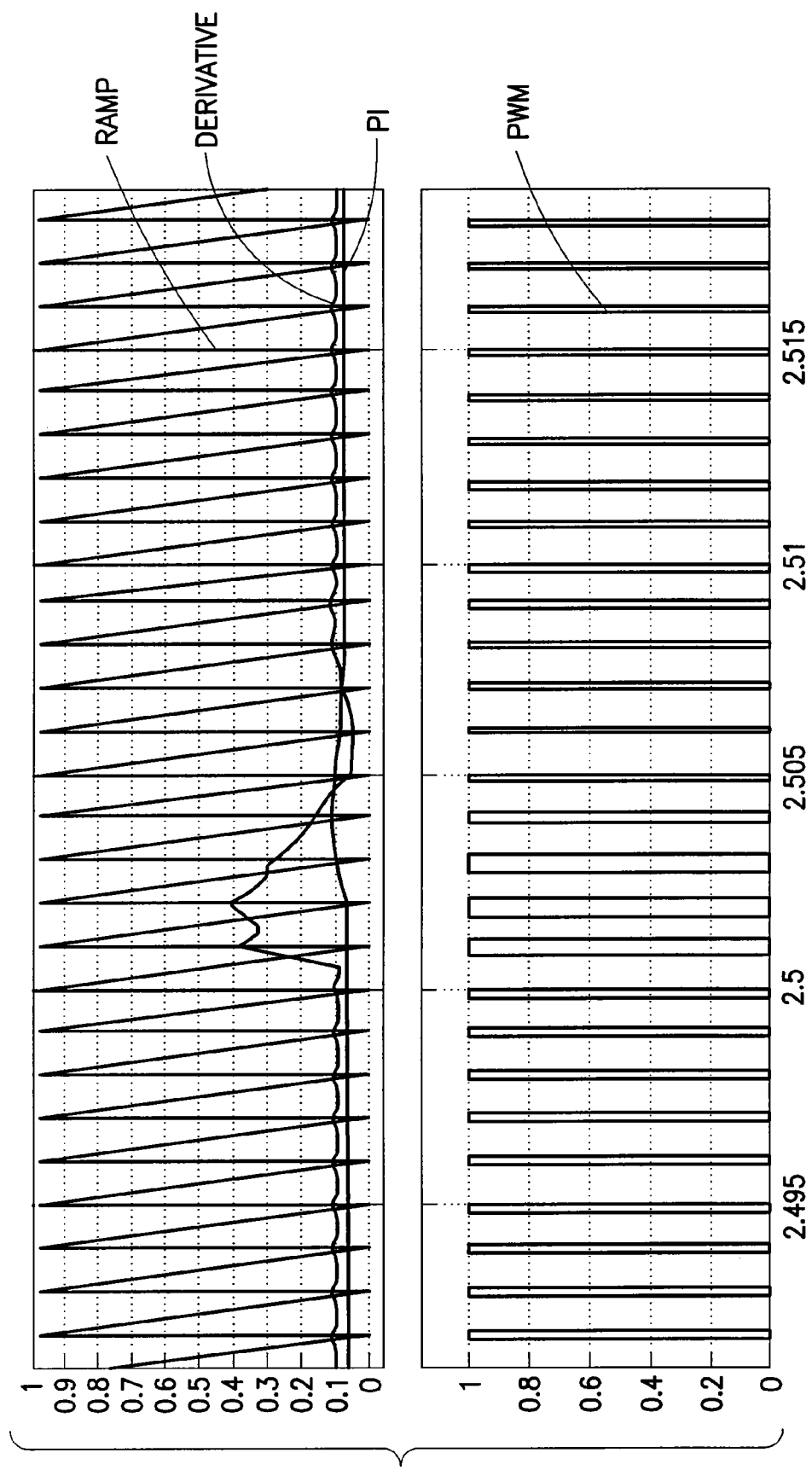
FIG. 3(a) is a graph illustrating PWM, Ramp, Proportional Integration and Derivative signals generated during the operation of the PWM controller of the present invention.
Figure 3B:
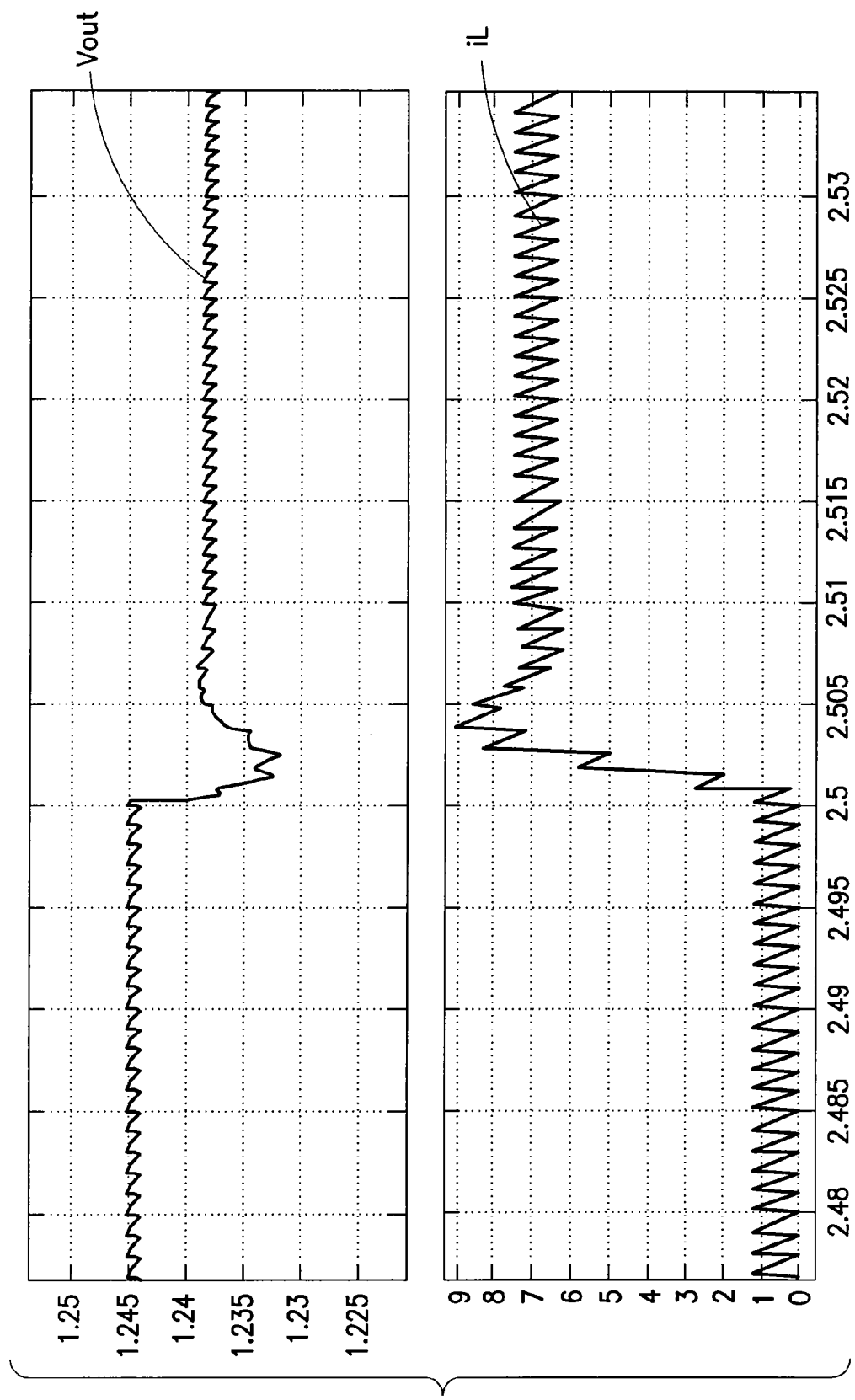
FIGS. 3(b) and 3(c) are graphs illustrating examples of step-up and step-down transient performance with the PWM controller of the present invention.
Figure 3C:
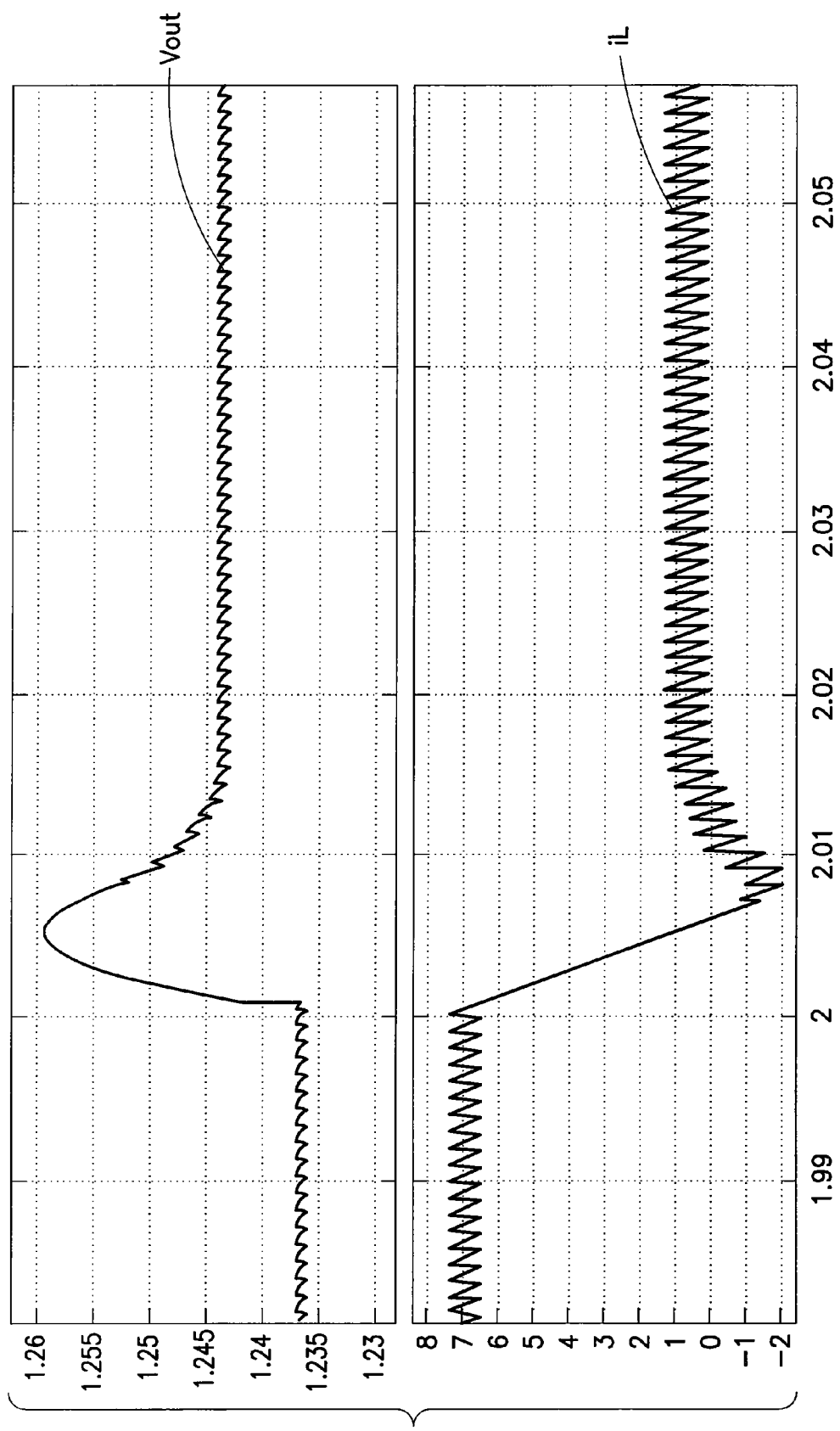

FIG. 3(a) illustrates the PWM, Ramp, Proportional Integration and Derivative signals generated during the operation of the PWM controller of FIG. 2(a). Also, FIGS. 3(b) and 3(c) respectively illustrate step-up and step-down transient performance of such PWM controller.

Figure 4:
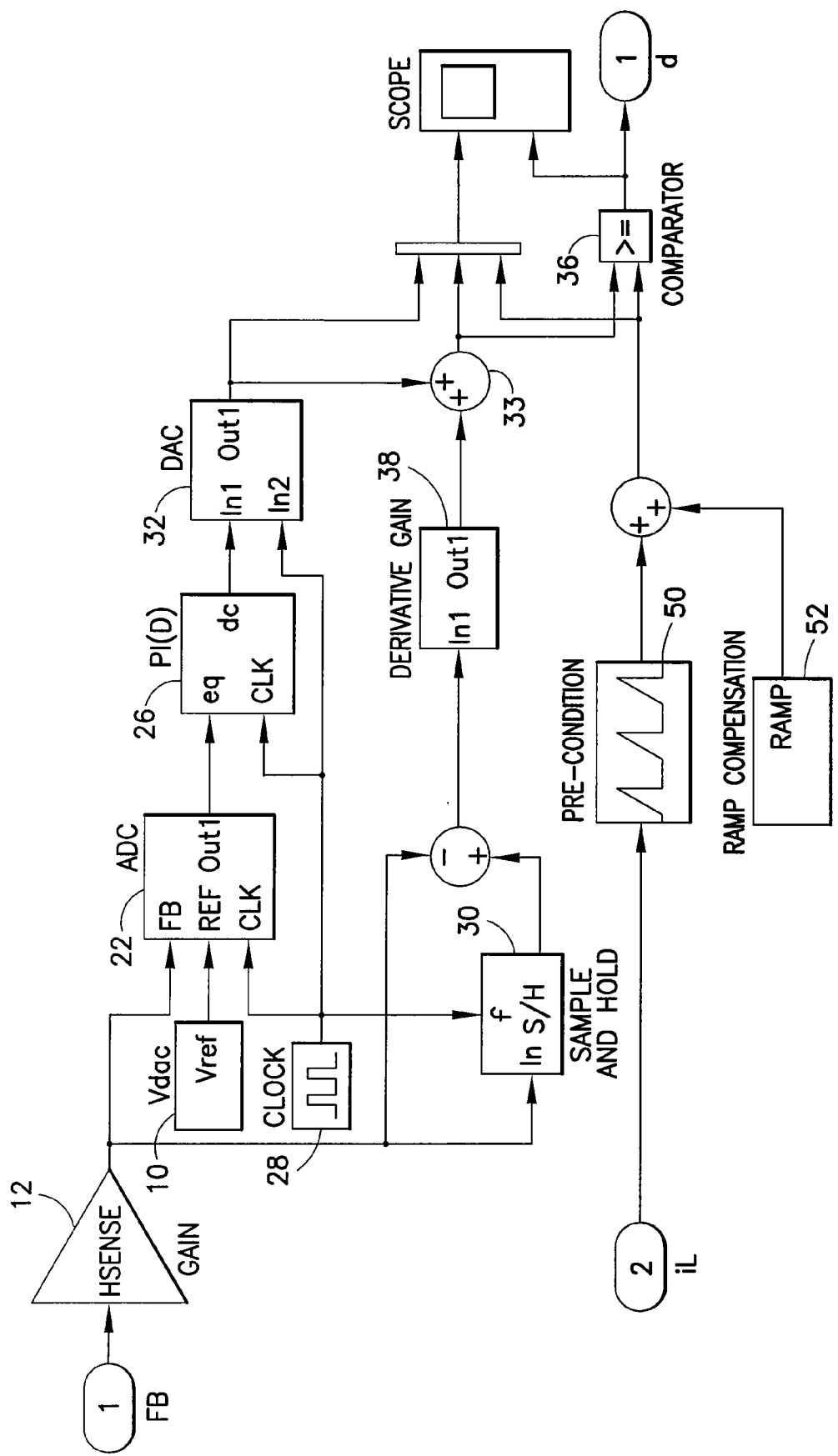
FIG. 4 is a block diagram of a preferred embodiment of a digital PWM controller of the present invention when the RAMP signal is replaced by an inductor current waveform to achieve current mode control.

Finally, as illustrated in FIG. 4, the digital PWM controller of the invention can be extended into a current mode control. This is achieved when the RAMP signal is replaced by an inductor current waveform, for example, a pre-condition signal 50 summed with a ramp compensation signal 52, to enable the PWM controller of the present invention to achieve current mode control.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A pulse width (PWM) controller for a voltage converter having at least one switch, an Analog to Digital Converter (ADC) circuit for digitizing inputted state variables including a feedback voltage from an output of the voltage converter and a reference voltage for setting the output of the voltage converter and providing a digital error signal, and a Proportional Integration and Derivation (PID) circuit receiving the digital error signal and providing a digital duty cycle signal, the controller comprising:
   a Digital to Analog Converter (DAC) circuit converting the digital duty cycle signal into an analog DAC output signal; and
   a comparator circuit comparing a first signal comprising the DAC output signal with a reference signal to generate a pulse width modulated control signal, said pulse width modulated control signal adapted to control the switching of the at least one switch of the voltage converter.

2. The controller of claim 1, further comprising: a derivative generating circuit for receiving a second signal comprising the feedback voltage and producing a derivative of the feedback voltage; and a summing circuit for summing the DAC output signal and the derivative of the feedback voltage in the first signal and providing the first signal to said comparator circuit.

3. The controller of claim 2, further comprising: a sample and hold circuit for receiving the feedback voltage and producing a delayed feedback voltage and a further summing circuit for summing the delayed feedback voltage and the feedback voltage and producing the second signal.

4. The controller of claim 3, further comprising a gain compensation circuit for providing gain to said derivative of the feedback voltage.

5. The controller of claim 3, further comprising an analog ramp circuit for generating the reference signal for the comparator circuit.

6. The controller of claim 5, further comprising: a circuit for providing the reference voltage; a circuit for receiving the feedback voltage from the voltage converter; and a clock generator circuit for synchronizing the ADC, the PID, the derivative generating circuit and the ramp circuit.

7. The controller of claim 4, wherein the first signal is provided to the comparator circuit to be compared with the reference signal for producing the PWM control signal.

8. The controller of claim 4, wherein the sample and hold circuit further receives a clock signal.

9. The controller of claim 8, wherein the output of the derivative generating circuit is calculated in accordance with the formula $(V(t)-V(n-1)/T(s)$ in the frequency domain.

10. The controller of claim 1, wherein the ADC circuit is window based.

11. The controller of claim 1, further comprising a low pass filter circuit to filter the output of the DAC circuit.

12. The controller of claim 11, wherein the DAC circuit allows a fewer number of bits to be used.

13. The controller of claim 1, wherein a window based ADC circuit and a DAC circuit with a fewer number of bits can be used to decrease die size and power consumption.

14. The controller of claim 6, wherein the clock frequency of the clock generator is the same as a switching frequency of the voltage converter.

15. The controller of claim 2, wherein the reference signal for the comparator circuit comprises an artificial analog ramp signal.

16. The controller of claim 2, wherein the referenced signal for the comparator circuit comprises a signal generated from a current through an output inductor of the voltage converter.

17. The controller of claim 1, wherein the PID circuit comprises: first and second delay circuits providing outputs; and first, second, and third sample and hold circuits providing outputs, wherein the first sample and hold circuit receiving the digital error signal, the second sample and hold circuit receiving the output of the first delay circuit, the third sample and hold circuit receiving the output of the second delay circuit, the first delay circuit receiving the output of the first sample and hold circuit, and the second delay circuit receives a sum of the outputs of the first and third sample and hold circuits.

18. The controller of claim 17, wherein the digital duty cycle signal is a sum of the output of the first sample and hold circuit Kp, a sum of the outputs of the first and second sample and hold circuits Kd, and a sum of the outputs of the first and third sample and hold circuits Ki.

19. The controller of claim 2, wherein the reference signal is synchronized with the system a clock and is kept within the analog domain to limit a need to have a clock frequency higher than the switching frequency, thereby decreasing the power consumption of the controller.

* * * * *